United States Patent
Joosten et al.

(10) Patent No.: US 11,054,307 B2
(45) Date of Patent: Jul. 6, 2021

(54) SPECTROMETER HAVING A MECHANICAL SHUTTER

(71) Applicant: Spectro Analytical Instruments GmbH, Kleve (DE)

(72) Inventors: Heinz-Gerd Joosten, Kranenburg (DE); Wolfram Bohle, Kleve (DE); Rolf Friedrich Frueke, Kleve (DE)

(73) Assignee: SPECTRO ANALYTICAL INSTRUMENTS GMBH, Kleve (DE)

( * ) Notice: Subject to any disclaimer, the term of this patent is extended or adjusted under 35 U.S.C. 154(b) by 0 days.

(21) Appl. No.: 16/733,733

(22) Filed: Jan. 3, 2020

(65) Prior Publication Data
US 2020/0217717 A1   Jul. 9, 2020

(30) Foreign Application Priority Data
Jan. 8, 2019   (DE) .................... 10 2019 100 290.7

(51) Int. Cl.
*G01J 3/02*   (2006.01)
*G01J 3/10*   (2006.01)
*G01J 3/18*   (2006.01)

(52) U.S. Cl.
CPC ............. *G01J 3/0232* (2013.01); *G01J 3/10* (2013.01); *G01J 3/18* (2013.01)

(58) Field of Classification Search
CPC .................................................. G01J 3/0232
USPC ....................................................... 357/313
See application file for complete search history.

(56) References Cited

U.S. PATENT DOCUMENTS

| | | | | |
|---|---|---|---|---|
| 4,988,196 A | * | 1/1991 | Gilligan ............... | G01J 3/2889 250/458.1 |
| 5,216,482 A | * | 6/1993 | Fukui .................... | G01N 21/63 356/313 |
| 5,394,237 A | * | 2/1995 | Chang ...................... | G01J 3/02 250/339.02 |
| 5,946,089 A | * | 8/1999 | Duer .................... | G01N 21/718 356/318 |
| 6,211,906 B1 | * | 4/2001 | Sun .......................... | G01J 3/26 348/143 |
| 6,355,930 B1 | * | 3/2002 | Sivathanu ................ | G01J 3/14 250/339.02 |
| 6,472,657 B1 | * | 10/2002 | Miles ....................... | G01J 3/02 250/231.15 |

OTHER PUBLICATIONS

Laqua et al, "Spectrochemical analysis with time-resolved spectra of spark discharges," Spectrochimica Acta, vol. 18 pp. 185-199 (1962).

\* cited by examiner

*Primary Examiner* — Tarifur R Chowdhury
*Assistant Examiner* — Omar H Nixon
(74) *Attorney, Agent, or Firm* — Panitch Schwarze Belisario & Nadel LLP

(57) ABSTRACT

A spectrometer may include a radiation source having a spark generator, an entrance slit, a dispersive element and a plurality of detectors, and a rotatable sector shutter having an axis of rotation and a trigger unit optically coupled to the sector diaphragm. The axis of rotation of the sector shutter is non-parallel to a connecting line between the source and the entrance slit.

10 Claims, 4 Drawing Sheets

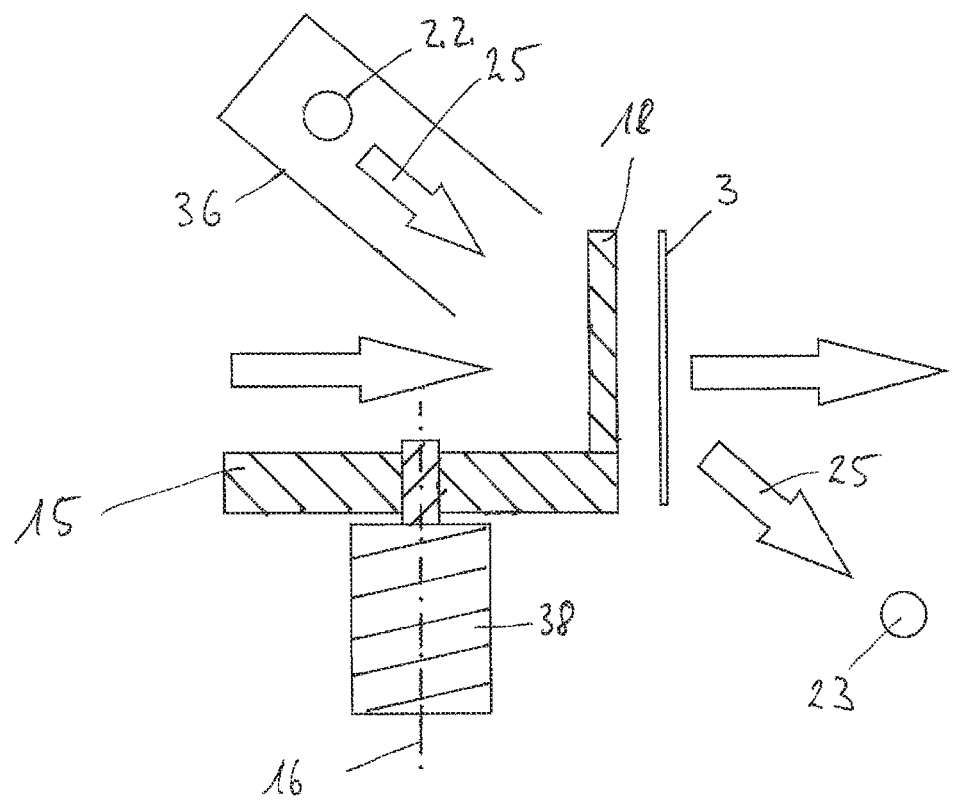

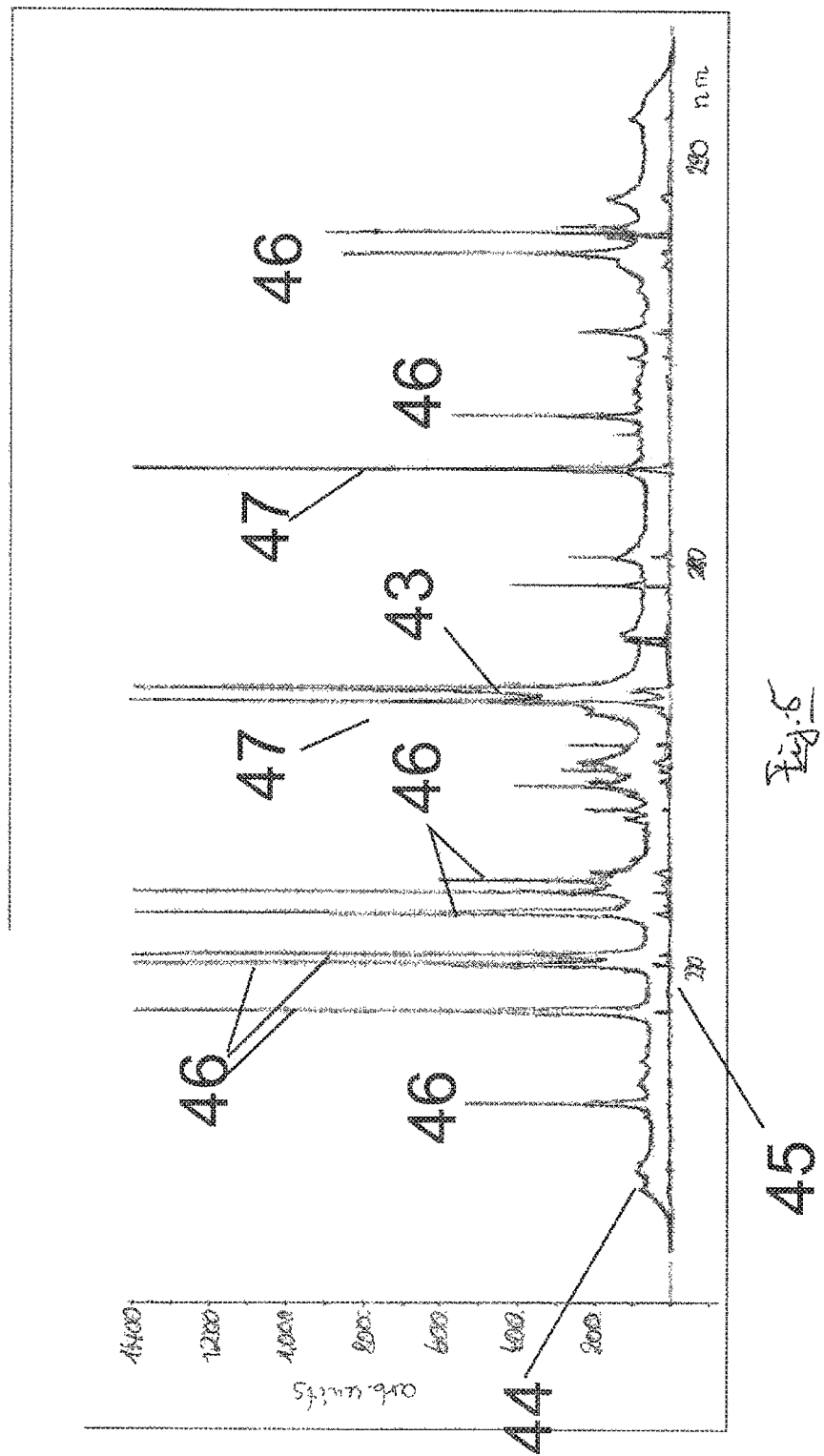

SPECTROMETER HAVING A MECHANICAL SHUTTER

CROSS-REFERENCE TO RELATED APPLICATION

This application claims priority under 35 U.S.C. § 119(b) to German Patent Application No. 10 2019 100 290.7, filed Jan. 8, 2019, the disclosure of which is incorporated herein by reference in its entirety.

FIELD OF ENDEAVOR

The present invention relates to a spectrometer.

BACKGROUND

A generic spectrometer is known from the publication "Spektrochemische Analyse mit zeitaufgelösten Spektren von Funkenentladungen" ("Spectrochemical analysis with time-resolved spectra of spark discharges") (Laqua K, Hagenah W-D., Spectrochim. Acta 1962.18, pp. 183-185). It describes a spark spectrometer for determining the element contents of samples, which has a rotating mechanical shutter in the form of a chopper wheel and triggering of the spark synchronised with the chopper wheel. It has proved to be advantageous not to integrate the complete spark signal, but to always integrate the same parts of each spark. The advantages of this device result from the fact that the beginning of the current-carrying spark phase can be masked out and thus an increase in detection sensitivity is achieved.

At the beginning of the spark discharge a high thermal background is created. During the current-carrying part of the spark, atomic and ionic lines appear. At the end of the current flow, in the so-called afterglow, the ionic lines disappear. The background radiation also decreases sharply. The remaining atomic lines are comparatively faint, but barely disturbed. The danger of radiation being absorbed by a layer of cooled atoms increases with the duration of the individual spark, whereas the impact pressure broadening of the lines is reduced. It can be useful to optimise the measurement of individual analyte lines by selecting a suitable spark section for them. Thus, one can try to improve the detection sensitivity, linearity, scattering and the usable content range of the calibration function or to reduce a line interference.

Another way to perform a time-resolved measurement is to use photomultipliers as detectors. In this case, photomultipliers and integrators are initially separated from each other. One detects the discharge current flow starting after the ignition of the spark, waits for the desired delay time v and then establishes the connection between photomultiplier and integrator for a desired duration d. Thus, only signals originating from the time interval between v and d+v are collected in the integrator. At the end of the spark sequence, this intensity is read and further processed.

However, this electrical method has some disadvantages. The switching process leads to noise components, which complicate the trace detection.

With the currently preferred semiconductor multi-channel sensors, a time-resolved measurement is not easily possible. It would be possible to start the integration at time v, integrate up to v+d and then read the spectrum. In this case, however, only the signal of an individual spark is obtained. The low useful signal would be lost in the noise.

The problem with the genus-forming prior art mentioned above is that the axis of rotation of the sector shutter is parallel to the light path between the source and the entrance slit and further to the dispersive element. Therefore, the sector shutter must rotate fully in front of the entrance slit. The sector shutter is therefore embodied as a plane rotating disk. Since the entrance slit of the spectrometer must be covered by the sector shutter and for this purpose the sector shutter must be located very close to the slit, approximately at a maximum distance of 0.1 mm, manufacturing tolerances for the sector shutter or vibrations during operation impair the function, in particular the closure of the entrance slit in the phase in which the entrance slit is to be closed. This also affects the reproducibility of the opening time and in particular the exact opening time.

It is therefore the object of the present invention to improve a generic device in such a way that a simpler closure of the entrance slit can be achieved with better reproducibility and less susceptibility to failure.

BRIEF SUMMARY OF ASPECTS OF THE DISCLOSURE

This object may be achieved by a device having the features as may be found in various ones of the attached claims.

Since a generic spectrometer additionally provides that the axis of rotation of the sector shutter is non-parallel to a connecting line between the source and the entrance slit, the design can be more compact and the reproducibility of the shutter opening time at the entrance slit is improved. In particular, the sector shutter can be made smaller than in the prior art because the drive does not have to be mounted axially parallel to the beam path between the source and the entrance slit. In addition, it is possible for the sector shutter to be driven directly without gear elements between the drive motor and the sector shutter.

If the sector shutter has a disc-shaped base body and shutter elements projecting axially from the base body, the sector shutter becomes particularly compact. Such a design can also be advantageously manufactured with precision, for example by machining as an aluminium alloy workpiece.

If the axis of rotation of the sector shutter is perpendicular to the connecting line between the source, the entrance slit and the dispersive element, the shutter elements can be aligned axially parallel to the axis of rotation.

Particularly simple control of the device is possible when the sector shutter is driveably connected to an electric motor for a constant speed drive.

In a particularly preferred configuration, the sector shutter may be provided with at least one optically scannable element which is optically connected to the trigger unit. This enables the sparks controlled by the trigger unit to be generated in a particularly precise temporal relation to the opening time of the sector shutter.

Simple and, in particular, reliable triggering is enabled if the optically scannable element is a reflector and is insensitive to interference. The scanning can then be done for example by illumination with an LED or a laser and the reflected light can be used to trigger the spark.

Particularly high triggering precision is possible if each shutter element is assigned an optically scannable element. Manufacturing tolerances that influence the distance between the individual shutter elements do not then affect the triggering, because each shutter element of the sector shutter can be triggered separately.

The trigger unit can preferably be configured to trigger the spark generator to generate a spark depending on the position of the sector shutter, and the optical scanning of the element of the shutter opening can advance to trigger the spark before the assigned shutter element frees the entrance slit. For this purpose, it is advantageous if the trigger unit controls the source before the shutter element frees the light path between the source and the entrance slit.

It is particularly advantageous if the trigger unit is provided with a phase-shifting unit which is designed, during operation, to change the generation of the spark relative to the position of the optically scannable element in time, in particular to delay it. In this way, the length of the early phase of each spark to be masked out can be set.

BRIEF DESCRIPTION OF THE DRAWINGS

Various aspects of this disclosure are described in greater detail below with reference to the following drawings. Shown are:

FIG. 4: a sector shutter with alternative optical triggering in a side view; and FIG. 5: two spectra in the UV range, of which one spectrum represents the total radiation captured by the spark spectrum and the other spectrum has been recorded with the initial phase of the spark masked out.

DETAILED DESCRIPTION OF ASPECTS OF THE DISCLOSURE

Figure 1:
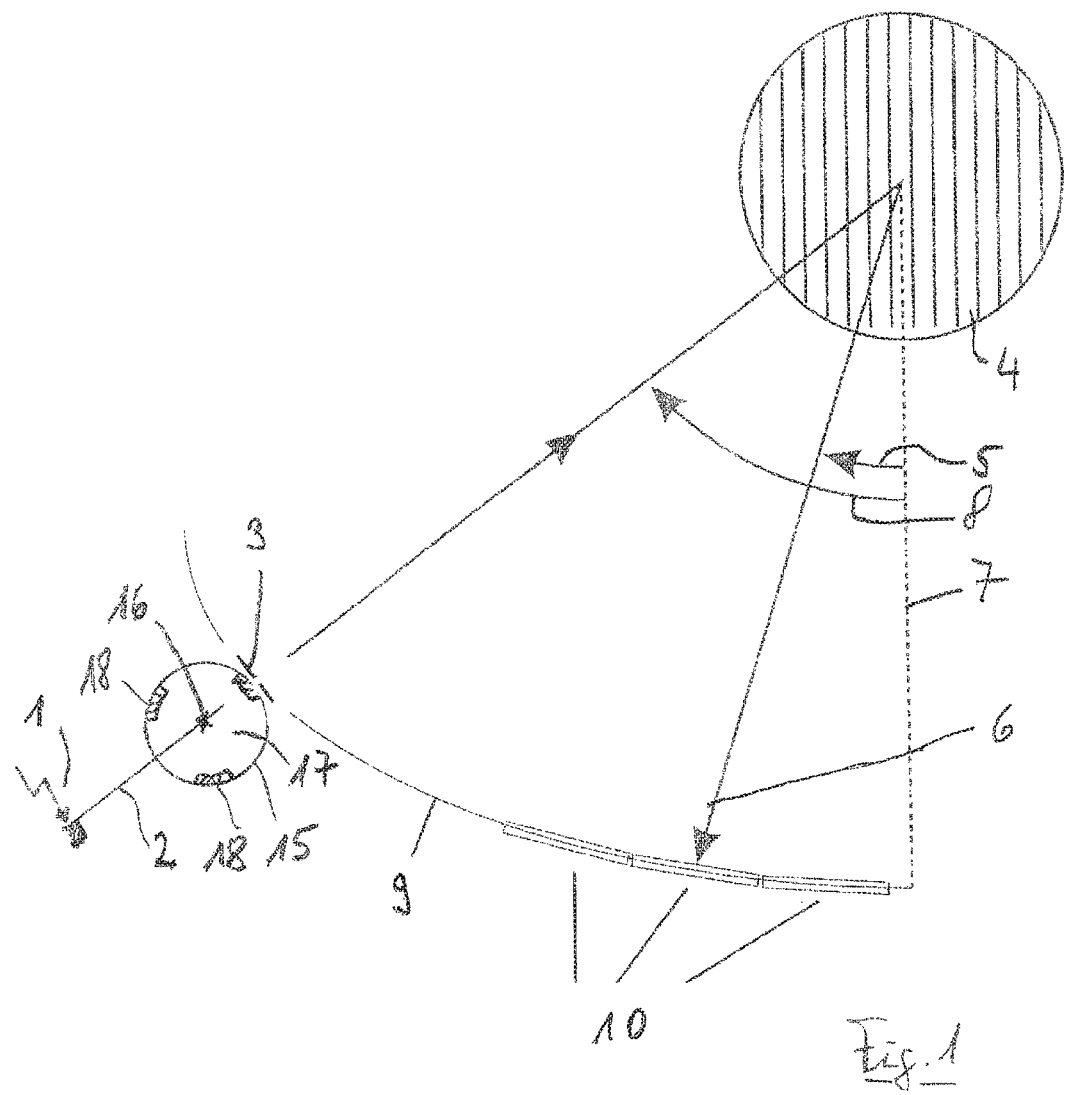
FIG. 1: a schematic representation of the light path in a spectrometer according to the invention.

The schematic structure of the optical system of a spectrometer is shown in FIG. 1. A source 1 generates incident radiation 2 with a plurality of wavelengths in the range of visible light and UV light. The relative intensities of the spectral lines are known to be a measure of the proportions of chemical elements in the sample. The radiation 2 enters at the beginning of the light path through the entrance slit 3 and falls from there onto a dispersive element, usually an optical grating 4, and is diffracted there. An angle 5 of the falling radiation 6 with respect to the grating normal 7 depends on the wavelength of the radiation and the angle 8 of the incident radiation (also with respect to the grating standard 7). The spectrum is imaged sharply on a focal curve 9, where sensors 10 are arranged. The sensors 10 are preferably designed as solid-body line sensors with one line of pixels each along a section of the focal curve. This is where the described light path ends within the spectrometer. FIG. 1 depicts only one falling beam 6. Since the incident radiation 2, however, is a mixture of many wavelengths, many different falling beams are involved, of which only one beam is shown as an example. The falling wavelengths appear as peaks in the spectra recorded by the sensors 10. The sensors 10 are mounted on the focal curve 9 in order to capture the sharpest possible peaks, i.e. wavelength-dependent diffracted images of the entrance slit 3.

FIG. 1 also shows a device that serves as a shutter for closing the entrance slit 3. This device comprises a sector shutter 15, which is mounted so that it can rotate about an axis of rotation 16. The axis of rotation 16 in FIG. 1 is perpendicular to the drawing plane. An electromotive drive of the sector shutter 15 is not visible in this illustration.

The sector shutter 15 has a circular disc-shaped base body 17 and three shutter elements 18, which are designed as webs and point upwards away from the base body 17 in the direction of the axis of rotation 16 at the edge of the base body 17. The shutter elements 18 are distributed at the same angular distance of 120° along the circumference of the base body.

The shutter elements 18 have the same width in the circumferential direction of the sector shutter 15 within the manufacturing tolerance. An uneven number of shutter elements 18 is generally provided so that the light path from the source 1 to the entrance slit 3 is interrupted only by the shutter element 18 located directly in front of the entrance slit 3.

The rotating sector shutter 15 makes it possible to interrupt and open the light path in front of the entrance slit 3 at regular intervals. This opening of the light path can be synchronised with the spark generator of the spectrometer, which drives source 1 in such a way that the opening takes place only after the start of the spark. If, for example, one wishes to mask out the first d microseconds of a spark for the reasons given above, one activates the ignition of the excitation generator exactly d microseconds before the slit is opened by one of the shutter elements 18.

In order to trigger the spark at the desired time, a signal is evaluated which provides information about the position of the shutter elements 18 and preferably an individual signal for each individual shutter element 18.

Figure 3:
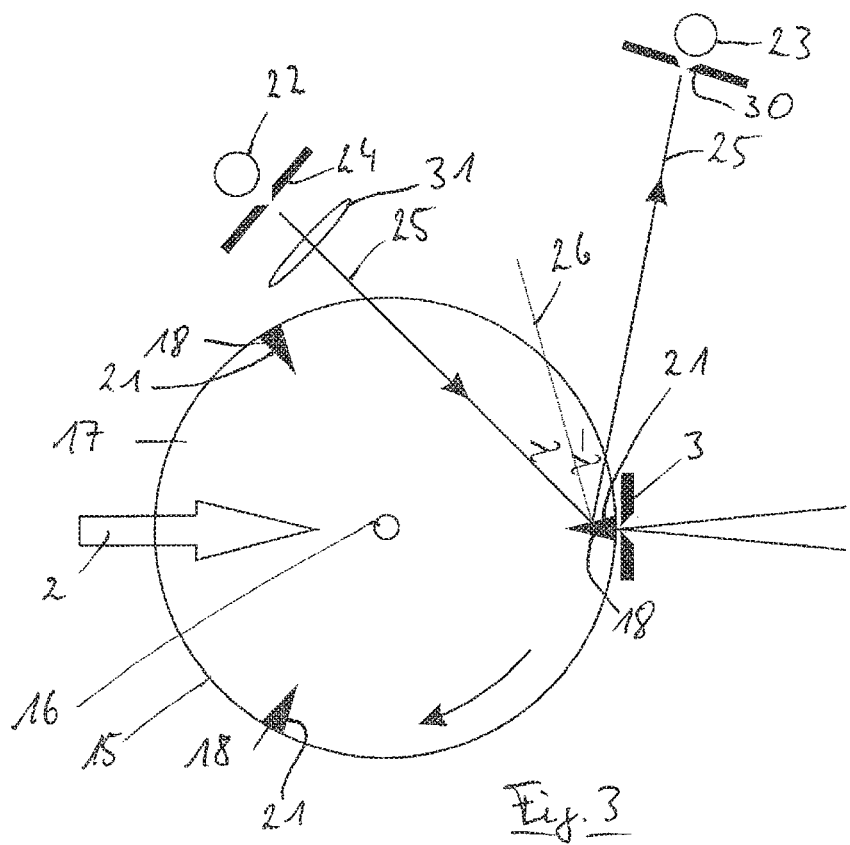
FIG. 3: a sector shutter with optical triggering in a schematic representation in accordance with FIG. 2.

FIG. 3 shows a way to obtain this information. The shutter elements 18 are provided with a mirrored surface 21 on one of the flanks. A punctiform light source, preferably an IR laser diode 22, is positioned so that it irradiates the mirrored surface 21 at the angle $\lambda$ to a normal 26 of the surface 21 with radiation 25 at the desired trigger time. The radiation 25 then leaves the mirrored surface 21 at the angle 4, and can be detected with an optical receiver 23, e.g. with an IR receiving diode. In order to determine the position belonging to the angle k as accurately as possible, the measurement beam should be as narrow as possible in the slit 30. This can be achieved, for example, by placing a slit 24 behind the light source 22, which slit limits the width of the light source 22. If a divergent light source, e.g. a light-emitting diode, is used, it is recommended to image the light penetrating through the slit 24 sharply onto the slit 30 using a lens 31. If a convergent light source, e.g. a laser, is used as the light source 22, the lens 31 can optionally be dispensed with. Sharp imaging can also be achieved using other optical elements, e.g. a spherical mirror instead of the lens 31. The position of the element to be imaged can also be varied. It can be located in the measurement beam 25. It is also possible to swap the position of the light source 22 and the detector 23 relative to the illustration in FIG. 3.

It is expedient to select the angle $\lambda$ so that it represents the longest time $t_{max}$ between the ignition time and the beginning of the spark on the one hand and the slit opening on the other hand. If a delay of $t_{max}$ is desired, the sparks are triggered immediately after the trigger signal appears. If a shorter delay time $t < t_{max}$ is desired, a time period of $t_{max} - t$ is waited for before the spark is triggered. This time can be varied in a control software without hardware modifications.

The speed of the sector shutter 15 is based on the desired spark sequence frequency f and depends on the number n of shutter elements 18 for the slit closure. The motor must then run at a speed of 60*f/n revolutions per minute. The speed should be kept as constant as possible, since speed fluctuations at closure times $t < t_{max}$ can lead to the slit not opening exactly at the desired time. In order to minimise this jitter, it is advantageous not to select a $t_{max}$ which is unnecessarily long.

In a preferred exemplary embodiment, the current speed of the sector shutter 15 is measured. If the sector shutter does not run at the provided target speed, the target waiting time $t_{max}$–t is corrected accordingly by the controller.

The arrangement described in FIG. 3 with triggering based on the reflection at the optically scannable element 21 provides good results, but is mechanically complex and requires a relatively large installation space.

FIG. 4 shows another exemplary embodiment with an arrangement for triggering by illumination of the entrance slit 3, which can be used as part of the trigger optics. This can be implemented more compactly and integrated into existing optical designs. The basic idea here is to use the sector shutter 15 and the entrance slit 3 to determine the trigger time. This side view schematically shows an electric motor 38, which drives the sector shutter 15 during operation.

Figure 2:
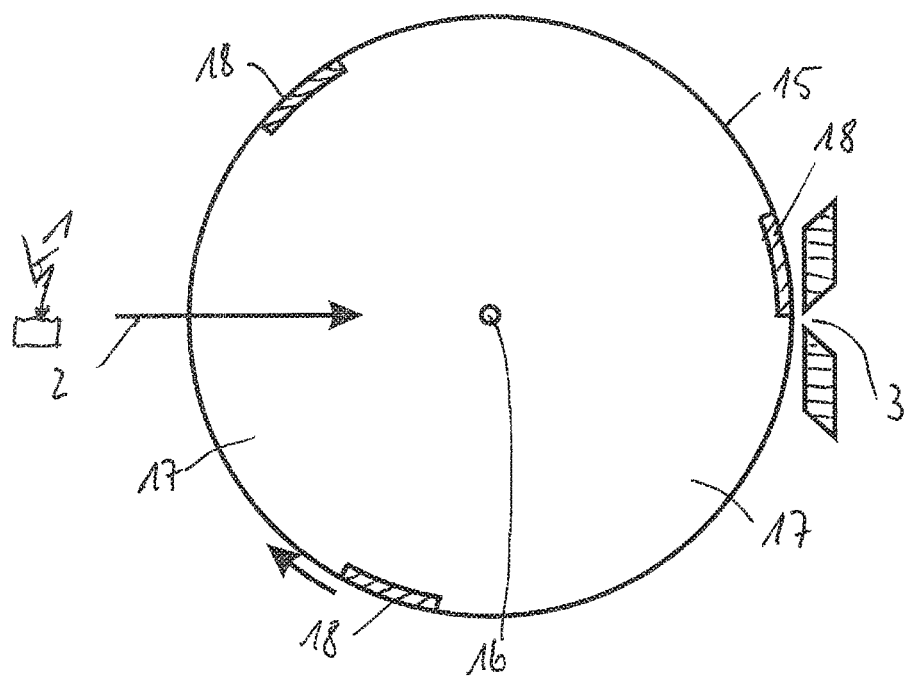
FIG. 2: the sector shutter from FIG. 1 in an enlarged view in the direction of the axis of rotation.

FIG. 4 shows this configuration in a side view transverse to the light path of the spectrometer and in a longitudinal section through the entrance slit 3. The light source 22 is mounted above the entrance slit 3. Behind the light source there is a collecting lens (not shown) which directs radiation from the light source 22 obliquely downwards. For better clarity, only one shutter element 18 has been drawn, which is located near the slit. The sector shutter 15 and the entrance slit 3 are arranged as in FIG. 2.

If no shutter element 18 covers the entrance slit 3, the measurement beam 25 of the optical triggering penetrates through the entrance slit 3 and reaches the detector 23 directly. The moment at which the entrance slit 3 is covered by the shutter element 18 is detected and used as the trigger time. If the spark is now triggered in the source 1, the entrance slit 3 remains covered until the shutter element 18 frees the entrance slit 3 again. The period between the covering of the entrance slit 3 and the subsequent freeing of the entrance slit 3 is again the longest possible time $t_{max}$, which can be masked out at the beginning of the spark. Also with this type of triggering, if a shorter delay time $t<t_{max}$ is desired, a time period of $t_{max}$–t is waited for before the spark is triggered. Also with this form of triggering, t can be varied without hardware modifications.

It is expedient to use an infrared diode as the light source 22. At wavelengths greater than 900 nm there are no wavelengths of interest for spark spectrometry. Thus, if this long-wave radiation reaches the dispersive element of the optical system, usually a grating, through the slit, it is diffracted in such a way that it does not reach any of the sensors used for analysis purposes. A partition 36 prevents scattered light from the light source 22 from reaching one of the sensors in the optical system.

With the two devices sketched in FIG. 3 and FIG. 4, the first spark phase can be masked out with an accuracy of a few microseconds. The duration of the masking-out can be varied by software without changing the mechanics. The devices also do not have the problems of electronic switching, which, as mentioned above, lead to a higher signal noise in time-resolved measurements with photomultiplier tubes.

Finally, FIG. 5 shows which effects can be achieved by masking out the entire current-carrying phase of a spark with a rectangular current course. A pure copper sample was measured. The spectral range displayed is between 260 and 293 nm (x-axis). The y-axis displays the measured intensities (quantities of light) in a linear scale with arbitrary units.

Without using the invention, the spectrum has the same course as shown in 44. If the entire current-carrying phase is masked out, the course of the lower spectrum is 45. It can be seen that the spectral background in the spectrum 45 is largely suppressed. This increases the detection sensitivity. The noise of the excitation source no longer plays a role. It also shows that ion lines largely disappear. Examples of ionic lines contained in the upper spectrum 44 are marked with the reference number 46. Although atomic lines 47 are weakened by a factor of 2 to 3, since the spectral background is reduced to almost zero, the detection limits can still be lowered by a factor of up to 10. Since interfering ionic lines, which are often superimposed on the atomic lines, disappear, the scattering of the calibration curves caused by line superimpositions can be reduced and the accuracy with which small contents are determined can be improved. An example of such a line is marked 43.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A spectrometer, comprising:
   a radiation source of a spark generator type generating incident radiation with a plurality of wavelengths in the range of visible light and UV light;
   an entrance slit;
   wherein the incident radiation enters through the entrance slit, and passes to a dispersive element and then onto a plurality of detectors,
   a sector shutter having an axis of rotation, and
   a trigger unit optically coupled to the sector shutter, wherein the axis of rotation of the sector shutter is non-parallel to a connecting line between the radiation source and the entrance slit.

2. The spectrometer according to claim 1, wherein the sector shutter has a disc-shaped base body and shutter elements projecting axially from the base body.

3. The spectrometer according to claim 2, wherein each shutter element is assigned an optically scannable element.

4. The spectrometer according to claim 1, wherein the axis of rotation of the sector shutter is perpendicular to the connecting line between the source and the entrance slit, and wherein the connecting line is also a connecting line between the source, the entrance slit, and the dispersive element.

5. The spectrometer according to claim 1, further comprising an electric motor, wherein the sector shutter is drivingly connected to the electric motor for a constant speed drive.

6. The spectrometer according to claim 1, wherein the sector shutter is provided with at least one optically scannable element which is optically connected to the trigger unit.

7. The spectrometer according to claim 6, wherein the optically scannable element is a reflector.

8. The spectrometer according to claim 6, wherein the trigger unit is provided with a phase-shifting unit which is designed, during operation, to change the generation of a spark relative to the position in time of the optically scannable element.

9. The spectrometer according to claim 1, wherein the trigger unit is designed to control the spark generator to generate a spark depending on a position of the sector shutter.

10. The spectrometer according to claim 1, wherein the trigger unit is designed to control the radiation source to generate a spark before a shutter element of the sector shutter frees a light path between the source and the entrance slit and such that the light path is freed following the spark, during an afterglow period in which ionic spectral components have substantially decreased.

* * * * *